United States Patent [19]

Schwefel et al.

[11] Patent Number: 5,001,340
[45] Date of Patent: Mar. 19, 1991

[54] ANGLE MEASURING ARRANGEMENT

[75] Inventors: Ernst Schwefel, Traunreut; Dieter Michel, Traunstein, both of Fed. Rep. of Germany; Olivier Pariaux, Lausanne, Switzerland

[73] Assignee: Dr. Johannes Heidenhain GmbH, Fed. Rep. of Germany

[21] Appl. No.: 426,056

[22] Filed: Oct. 24, 1989

[30] Foreign Application Priority Data

Oct. 28, 1988 [DE] Fed. Rep. of Germany ....... 3836703

[51] Int. Cl.⁵ .............................................. G01D 5/34
[52] U.S. Cl. ........................... 250/231.16; 250/237 G; 250/227.21
[58] Field of Search ...................... 250/227.21, 231.13, 250/231.14, 231.16, 237 G; 350/96.17; 357/30 M

[56] References Cited

U.S. PATENT DOCUMENTS

| | | | |
|---|---|---|---|
| 4,555,625 | 11/1985 | Mosier et al. | 250/231.16 |
| 4,654,524 | 3/1987 | Kita | 250/237 G |
| 4,750,821 | 6/1988 | Yamamoto et al. | 250/231.14 |
| 4,792,678 | 12/1988 | Spies | 250/231.16 |

FOREIGN PATENT DOCUMENTS

| | | |
|---|---|---|
| 3702314 | 1/1988 | Fed. Rep. of Germany . |
| 3625327 | 2/1988 | Fed. Rep. of Germany . |
| 3633574 | 4/1988 | Fed. Rep. of Germany . |
| 3705653 | 7/1988 | Fed. Rep. of Germany . |

OTHER PUBLICATIONS

"Photoelektrische Messung der Anderung von Lengen-Order Winkelpositianen mit Hilfe von Beugungsgittern" (Photoelectric Measurements of the Change of Length of Angular Positions with the Aid of Refraction Grids) F. Hock, 1975.
"Laser Rotary Encoders," Tetsuharu Nishimura, et al., Motion, Jul./Aug. 1986.

Primary Examiner—David C. Nelms
Assistant Examiner—Khaled Shami
Attorney, Agent, or Firm—Willian Brinks Olds Hofer Gilson & Lione

[57] ABSTRACT

An interferometric type photoelectric measuring device is disclosed. The photoelectric angle measuring device includes a graduation carrier having a circular graduation and a scanning arrangement for the diametral scanning of the circular graduation. The scanning arrangement is constructed as an integrated optical circuit.

14 Claims, 5 Drawing Sheets

ANGLE MEASURING ARRANGEMENT

BACKGROUND OF THE INVENTION

The present invention relates generally to a photoelectric angle measuring arrangement and more particularly to a photoelectric measuring arrangement of the type which includes a circular graduation.

Angle measuring arrangements of the interferometric type which include a graduation carrier carrying a circular graduation, and a scanning arrangement which scans the diameter of the circular graduation are typically used in processing machines which measured the relative position of a tool with respect to a workpiece which is to be processed.

For example, in the dissertation "Photoelektrische Messung der Anderung von Langen-Order Winkelpositianen mit Hilfe von Beugungsgittern" (Photoelectric Measurements of the Change of Length or Angular Positions With the Aid of Refraction Grids) F. Hock, 1975 illustrates (in FIG. 86) an angle measuring arrangement for the elimination of the eccentricity error of the angle graduation of a graduating disk. In this disclosed arrangement, a light beam from a light source penetrates a first angle graduation zone of the angle graduation of the graduating disk through a condenser. The light beam is split into two partial beams by feeding the light beam through a first pentaprism, a first deflecting prism and a first lens to a Wollaston prism. The two partial beams penetrate a second angle graduation zone on the graduating disk, which lies diametrally opposite to the first angle graduation zone, through a second lens, a second pentaprism and a second deflecting prism. The two partial beams then are received on two photoreceivers over a polarizing divider prism. This angle measuring arrangement has the disadvantage that it has large dimensions and requires a large expenditure in assembling and adjusting due to the multiplicity of optical elements.

The publication "Motion" July/August 1986 in an article entitled "Laser Rotary Encoder" by Nishimura et al. also discloses (on pages 3 and 4) an angle measuring arrangement for the elimination of the eccentricity error of the angle graduation of a graduating disk. In this disclosed arrangement, a light beam from a laser diode is split into two partial beams by a polarizing divider prism. A first partial beam penetrates a first angle graduation zone of the angle graduation of the graduating disk over a first phase plate and a flat mirror to generate refraction beams. The positive first order refraction beam is then reflected back into the polarizing divider prism by means of a first reflector through the first angle graduation zone, the first mirror and the first phase plate. The reflected positive refraction beam is received by a first photoreceiver over a third phase plate, a beam divider and a first polarization plate. The second partial beam penetrates a second angle graduation zone of the angle graduation of the graduating disk over a second phase plate and a second mirror to generate refraction beams. The negative first order refraction is reflected back into the polarizing divider prism by means of a second reflector through the second angle graduation, the second mirror and the second phase plate. The reflected negative refraction beam is received by a second photoreceiver over the third phase plate, the beam divider and over a second polarization plate. This angle measuring arrangement is relatively expensive and requires a large expenditure in assembling and adjusting.

German DE-A1-36 33 574 describes a simpler, and thus more economically produced, angle measuring arrangement having smaller dimensions. The angle measuring arrangement disclosed in this reference is insensitive to wobble errors of the graduation carrier. Eccentricity errors are also eliminated.

It is desirable to provide a high-resolution angle measuring arrangements with even smaller construction size and an even simpler construction than available systems which also provides a measuring accuracy and operating reliability surpassing those of conventional angle measuring arrangements.

Therefore, in view of the above it is an object of the present invention to provide a high-resolution angle measuring arrangement which may be constructed with small construction size.

It is a further object of the present invention to provide a high resolution angle measuring arrangement with a simple construction.

It is still a further object of the present invention to provide a high resolution angle measuring arrangement which provides a higher accuracy and operating reliability than presently available angle measuring arrangements.

SUMMARY OF THE INVENTION

To achieve the foregoing and other objects the photoelectric measuring arrangement of the present invention is of the interferometric type including a graduation carrier which carriers a circular graduation, and a scanning arrangement for the diametral scanning of the circular graduation. The scanning arrangement of the photoelectric angle measuring arrangement of the present invention is constructed as an integrated-optical circuit.

With the integrated-optical construction of the angle measuring arrangements of the present invention, the angle measuring arrangement may be made extremely small in size. The integrated-optical construction of the scanning arrangement of the present invention also has a relatively high insensitivity to environmental influences.

Additional objects, advantages and novel features of the invention will be set forth in the description of the presently preferred embodiments which follows and in part will become apparent to those skilled in the art upon examination of the following. The objects and advantages of the invention may be obtained by means of the combinations particularly pointed out in the appended claims.

DESCRIPTION OF THE PRESENTLY PREFERRED EMBODIMENTS

The construction and diametric arrangements shown in the examples which follow for the various embodiments are obviously in schematic form, since the actual relations in optical integrated circuits can hardly be represented graphically.

Figure 1:
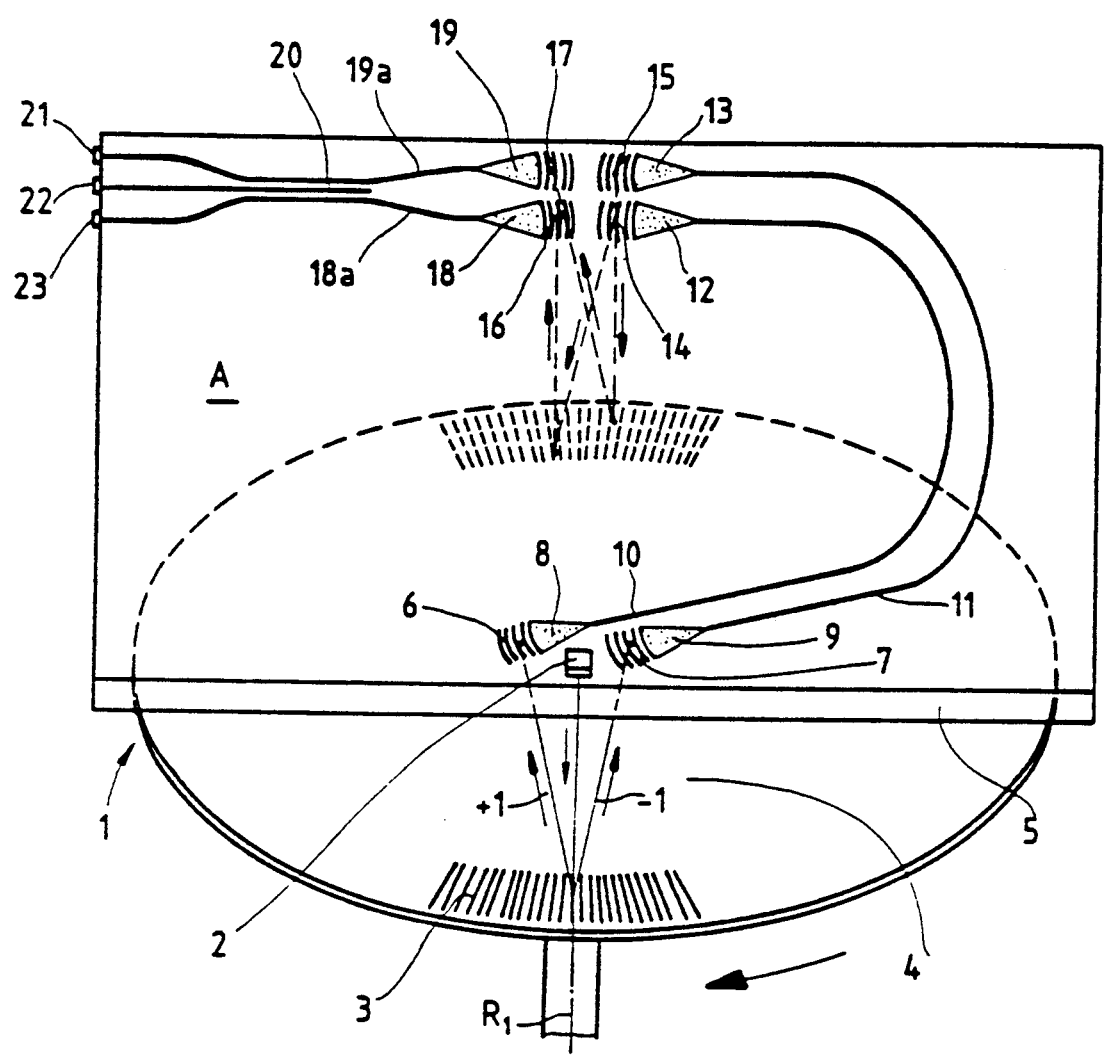
FIG. 1 illustrates a preferred embodiment of an angle measuring arrangement with strip waveguides and couplers.

Referring now to the drawings and specifically to FIG. 1, an angle measuring arrangement 1 is schematically illustrated. The scanning arrangement 1 includes a circular graduation 3 on a graduation disk 4 onto which light from a laser 2 falls upon in a first scanning zone. Preferably, the circular graduation 3 is formed as a phase grid. The light from the laser 2 is refracted on the phase grid forming two partial beam bundles $+1$ and $-1$ of the first order of refraction. The two partial beam bundles $+1$ and $-1$ are reflected as illustrated. Other orders of refraction are not evaluated.

The laser 2, which is preferably a semiconductor laser, is preferably integrated on a substrate 5 which is a carrier for the monolithically integrated optical circuit which forms the scanning arrangement A. The monolithically integrated optical circuit forming the scanning arrangement A preferably comprises two coupling-in grids 6 and 7.

The reflected positive first order partial beam bundle $+1$ impinges upon the coupling-in grid 6. Similarly, the reflected negative first order partial beam bundle $-1$ impinges on the coupling-in grid 7. The coupling-in grids 6 and 7 focus the refracted light and then the light is fed into two strip waveguides 10 and 11 through optical constrictions 8 and 9, respectively.

The light of the refracted partial beam bundles $+1$ and $-1$ is guided in the strip waveguides 10 and 11 on the substrate 5 to a diametrally located second scanning zone. Coupling grids 14 and 15 are disposed at the other end of the strip waveguides 10 and 11. Optical expansions 12 and 13 connect the strip waveguides 10 and 11 to the decoupling grids 14 and 15. The decoupling grids 14 and 15 deflect the light of the refracted partial beam bundles $+1$ and $-1$ onto the circular graduation 3. On the circular graduation 3, the light is again refracted, fed to further coupling-in grids 16 and 17 and fed into, a coupler 20 over further waveguides 18a and 19a. The partial beam bundles of the $+1$ and of the $-1$ order are brought into interference in the coupler 20. In this manner three-phase shifted light bundles are detected by three detectors 21, 22 and 23 at the output of coupler 20.

The phase positions of the twice-refracted beam bundles on the circular graduation change due to the relative movements between the scanning arrangement A and the graduating disk 4. The change in phase positions has the effect of generating signals which have periods corresponding to one-fourth ($\frac{1}{4}$) of the graduation period of the circular graduation 3.

Thus, the eccentricity which may be present is substantially eliminated due to the double scanning and diametral scanning zones.

Figure 2:
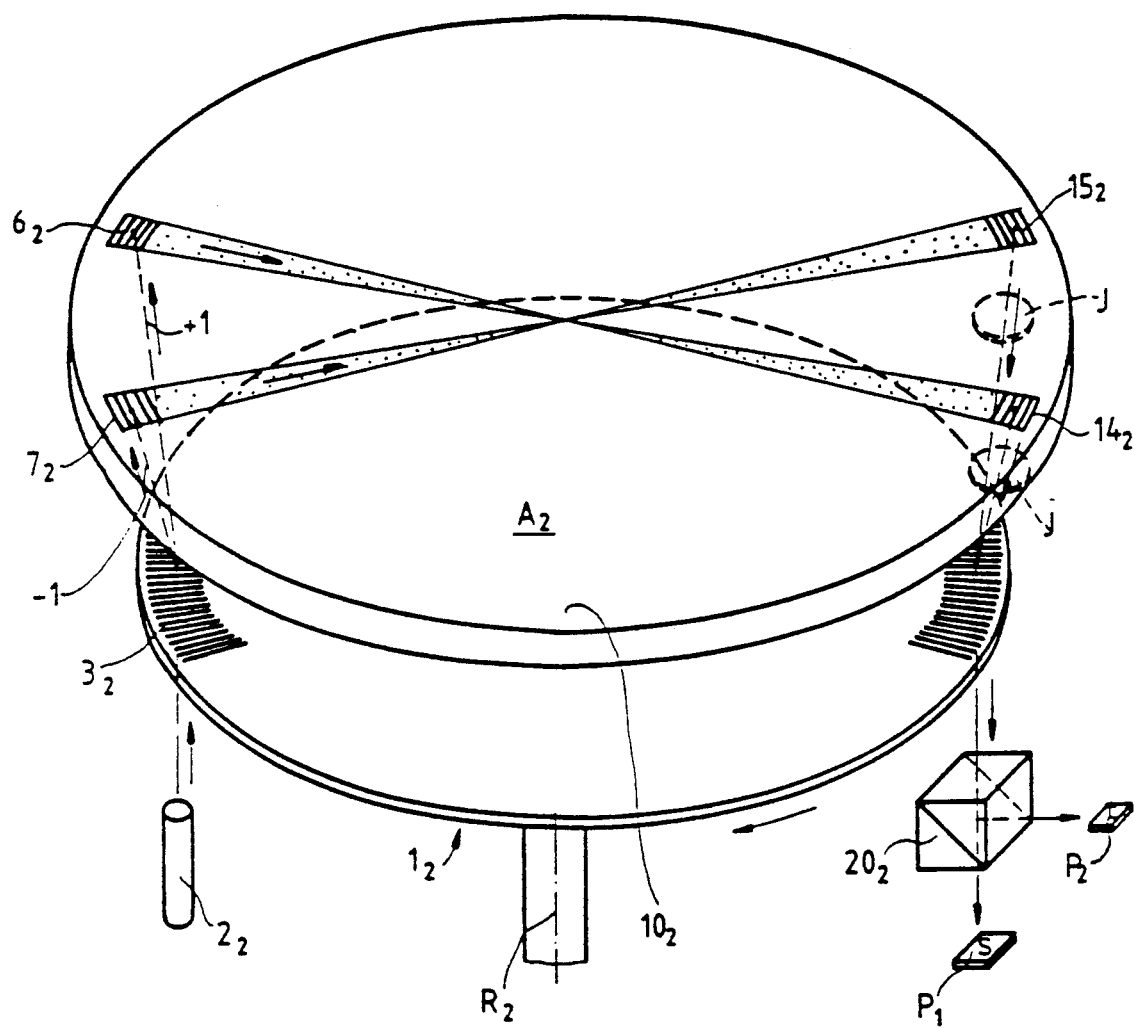
FIG. 2 illustrates an angle measuring arrangement with layer waveguide and focusing grids.

FIG. 2 illustrates another preferred embodiment of the present invention which operates with transmitted light. In this embodiment, a light originating from a semiconductor laser $2_2$ is refracted on a circular graduation $3_2$ which is preferably constructed as a phase grid. The partial beam bundles of the $+1$ and $-1$ order of refraction impinge on a focusing coupling-in grids $6_2$ and $7_2$. From the coupling-in grids $6_2$ and $7_2$, the partial beam bundles are guided, by means of a laser waveguide $10_2$, to diametrally arranged decoupling grids $14_2$ and $15_2$. The partial beam bundles $+1$ and $-1$ cross in the focal point of the focusing coupling-in grids $6_2$ and $7_2$ without mutually influencing each other. The decoupling grids $14_2$ and $15_2$ again deflect the partial beam bundles $+1$ and $-1$ such that they are again refracted by the circular graduation $3_2$. After penetrating an optical polarizer J, the two partial beam bundles $+1$ and $-1$ are brought into interference on a polarizing-optical divider prism $20_2$ from which they impinge on photodetectors $P_1$ and $P_2$. The photodetectors $P_1$ and $P_2$ deliver two periodic scanning signals phase-displaced relative to one another by 90 $\frac{1}{2}$. A quadrupling effect of the scanning signals with respect to the frequency also occurs in this embodiment. The eccentricity is also substantially eliminated with this embodiment.

Figure 3:
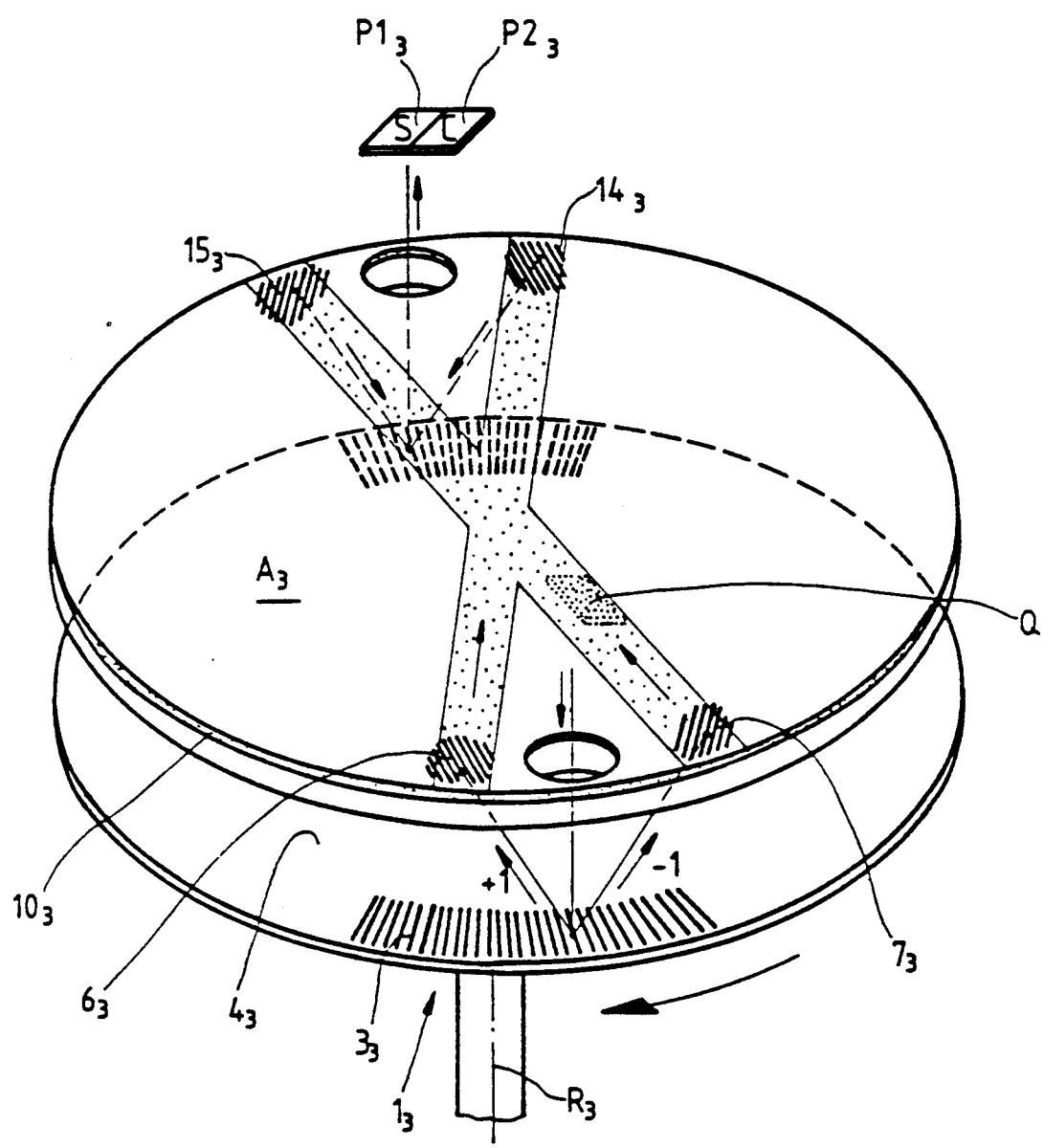
FIG. 3 illustrates a preferred embodiment of an angle measuring arrangement with layer waveguide and collimation grids.

Referring now to FIG. 3 a so-called transmitted-light angle measuring arrangement $1_3$ is illustrated. Light from a laser (not represented) radiates through an opening in a layer waveguide $10_3$ onto a circular graduation $3_3$ which is provided on a graduating disk $4_3$. Partial beam bundles $+1$ and $-1$ of the positive first order of refraction and of the negative first order of refraction are generated, inter alia, by refraction on the phase grid of a circular graduation $3_3$. These partial beam bundles $+1$ and $-1$ are reflected onto collimating coupling-in grids $6_3$ and $7_3$. The collimated partial beam bundles $+1$ and $-1$ are transmitted to a layer waveguide $10_3$ and then transmitted to diametrally arranged decoupling grids $14_3$ and $15_3$.

The layer waveguide $10_3$ includes a phase shifting element Q disposed in a zone through which one of the two partial beam bundles $+1$ and $-1$ must pass through as it is being guided to the respective diametral decoupling grid $14_3$, $15_3$. The phase shifting element Q shifts one-half of one of the partial beam bundles $+1$ or $-1$ such that it is phase-displaced as it enters into the decoupling grid $14_3$ or $15_3$.

The decoupling grids $14_3$ and $15_3$ lead the partial beam bundles $+1$ and $-1$ back into the circular graduation 33 where they are brought into interference. The partial beam bundles $+1$ and $-1$ which have been brought into interference are then reflected onto detectors $P1_3$ and $P2_3$ through another aperture in the layer waveguide $10_3$. The detectors $P1_3$ and $P2_3$ also provide scanning signals, of the type described above, which are phase-displaced relative to one another.

The phase-shifting element Q which is used for phase shifting can be, for example, a zone in and/or on the layer waveguide $10_3$ which has a different index of refraction than that of the rest of the layer waveguide. The zone has a predetermined calculable width and length. This embodiment is particularly advantageous since it may also be constructed as an integrated optical circuit.

Figure 4A:
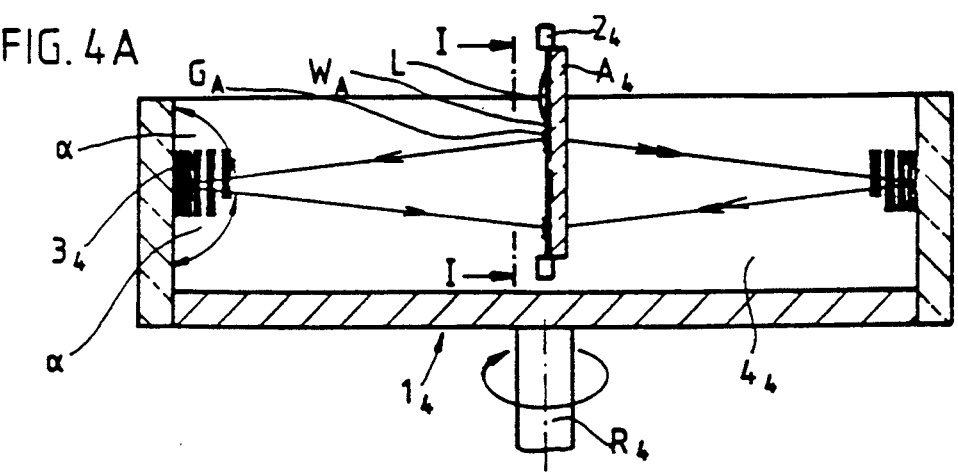
FIG. 4A illustrates a sectional view of a preferred embodiment of an angle measuring arrangement in cylindrical form.

Referring now to FIGS. 4A–4C and 5A–5C, another embodiment of the angle measuring arrangements of the invention is illustrated. A sectional view of a so-called "drum transmitter" is illustrated in FIG. 4A. A measuring graduation $3_4$ is disposed concentrically on the inner wall of a cylinder $4_4$ which is rotatably mounted about its axis of rotation $R_4$. For purposes of clarity, the drum transmitter is not illustrated in its entirety. A stationary scanning arrangement $A_4$ which is preferably an integrated optical circuit is provided in the center of the cylinder $4_4$. The scanning arrangement $A_4$ is preferably arranged substantially central to and parallel to the axis of rotation $R_4$.

Figure 4B:
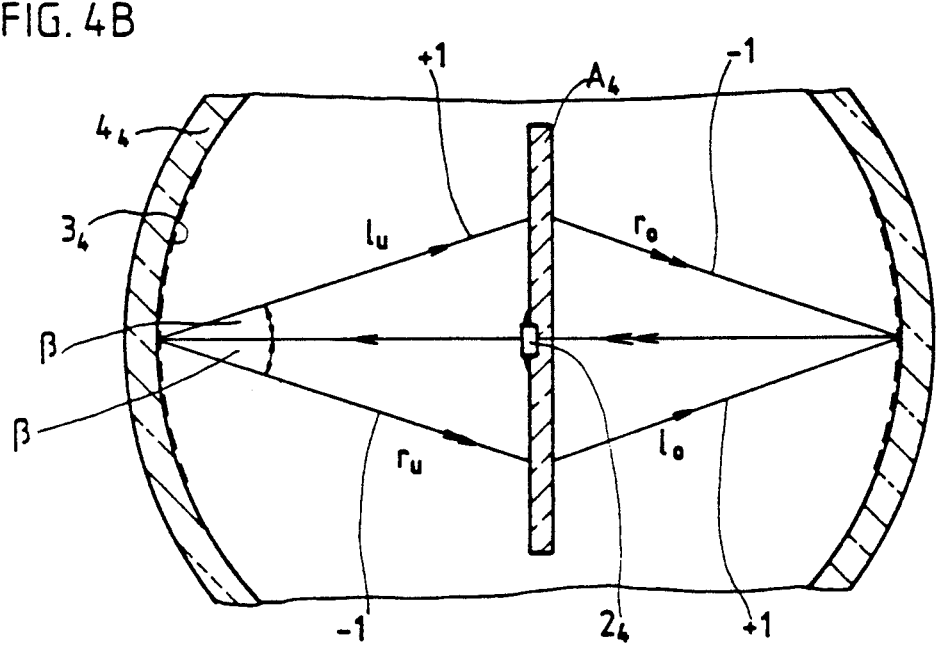
FIG. 4B is a partial plan view of the angle measuring arrangement illustrated in FIG. 4A.
Figure 4C:
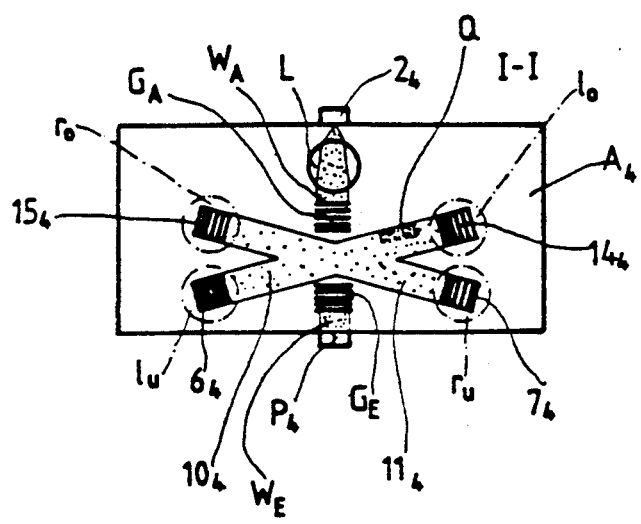
FIG. 4C is a view through lines I—I of the scanning arrangement for the angle measuring arrangement illustrated in FIG. 4A.

FIG. 4B illustrates a partial cutout plan view of the embodiment of FIG. 4A. FIG. 4C illustrates a preferred embodiment of the integrated optical circuits for the stationary scanning arrangement $A_4$.

For purposes of understanding the scanning of this embodiment, it is necessary to combine the concepts represented in all three partial representations of FIGS. 4A, 4B, and 4C, since it is difficult to graphically represent the resulting spatial beam paths. For this reason, expressions like "above", "below", "to the right", "to the left", "behind", "in front", and the like (which are not technical terms used in optics) are used in the following description. The use of these terms is intended to facilitate the understanding of the invention.

A semiconductor laser $2_4$ irradiates light, which is collimated preferably by an integrated optical collimator lens L in a waveguide $W_A$. The light is directed onto the measuring graduation $3_4$ of the cylinder $4_4$ by means of a decoupling grid $G_A$. The beam path runs at an angle A relative to the axis of rotation $R_4$ inclined from the decoupling grid $G_A$ to the measuring graduation $3_4$. From the measuring graduation $3_4$ the beam is reflected and refracted such that two beam bundles $+1$ and $-1$ of the positive and of the negative first order are directed to impinge upon coupling-in grids $6_4$ and $7_4$. The two beam bundles $+1$ and $-1$ are inclined at the same angle A relative to the axis of rotation $R_4$ of the cylinder $4_4$.

As illustrated in FIG. 4B, the partial beam bundles $+1$ and $-1$ are additionally subject to an angle of refraction $\bar{A}$ in another plane. The partial beam bundle $+1$ impinges therefore "to the left below" (1 u) upon the coupling-in grid $6_4$. The partial beam bundle $-1$ impinges "to the right below" (ru) upon the coupling-in grid $7_4$. Waveguides $10_4$ and $10_4$ guide the partial beam bundles $+1$ and $-1$ to oppositely lying decoupling grids $14_4$ and $15_4$ (see FIG. 4C). Due to the specific geometry chosen, the fact that the two waveguides $10_4$ and $11_4$ cross has no detectable influence on the propagation of the partial beam bundles $+1$ and $-1$.

In FIG. 4C, the decoupling grid $14_4$ is located above the coupling-in grid $7_4$ (to the right below). However, since the coupling-in grid $7_4$ provides the decoupling grid for the "left channel" it is consistent if it is designated as "to the left above" (lo). Similarly, it is consistent if the decoupling grid $15_4$ is designated as "to the right above" (ro), since it is located above the left coupling-in grid $6_4$. These apparent inconsistencies may be understood when the entire beam path is considered. For example, assuming that the view considered in FIG. 4C of the substrate of the scanning arrangement $A_4$ is the front side, then the coupling grids $14_4$ and $15_4$ will act on the back of the substrate. If the scanning arrangement $A_4$ is viewed in its correct positions in FIGS. 4A and 4B, the decoupling grid $14_4$ is "to the left above" and the grid $15_4$ is "to the right above" (as viewed from the back of the substrate).

The partial beam bundle $+1$, which was guided by the waveguide $10_4$ from the coupling-in grid $6_4$ (to the left below) to the decoupling grid $14_4$ (to the left above), is directed to a zone in the measuring graduation $3_4$ which lies opposite the zone described at the outset. This arrangement thus provides diametral scanning.

In partial beam bundle $-1$, which was guided by the waveguide $11_4$ from the coupling-in grid $7_4$ (to the right below) to the decoupling grid $15_4$ (to the right above), is also directed to the zone described above of the measuring graduation $3_4$.

The partial beam bundles $+1$ and $-1$ are refracted, brought into interference, and reflected such that the resulting beam bundle is directed to a coupling-in grid $G_E$ which is disposed on the substrate of the scanning arrangement $A_4$. The phase shifting may occur by bringing the partial beam bundles $+1$ and $-1$ into interference in a manner similar to that which was described above with reference to FIG. 3. The resulting beam bundle which impinges upon the coupling-in grid $G_E$ is deflected from the coupling-in grid GE into the plane of the waveguide $W_E$. At least one photodetector $P_4$ transduces the intensity-modulated beam bundle into an electrical output signal.

Figure 5A:
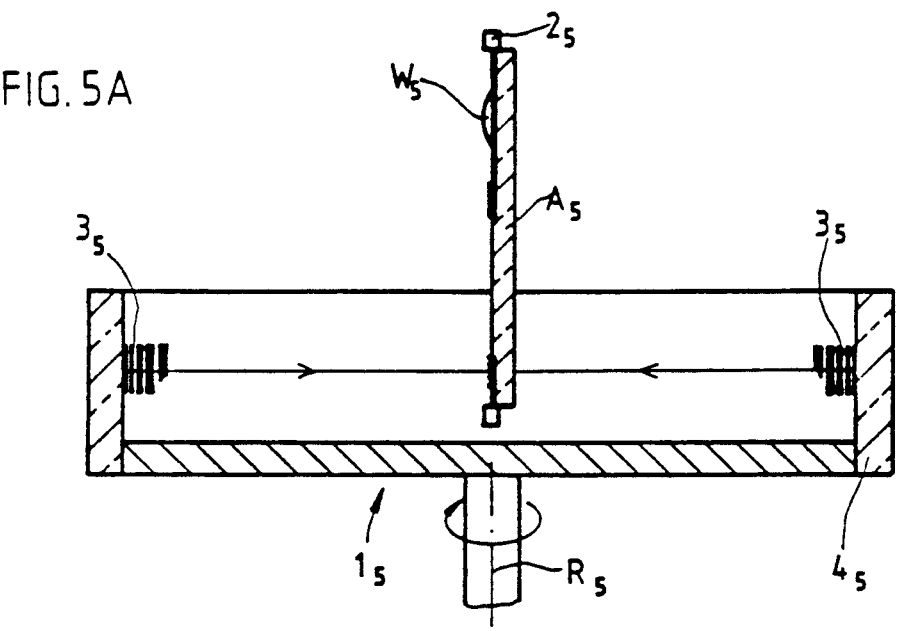
FIG. 5A is a second preferred embodiment of the angle measuring arrangement illustrated in FIG. 4A.
Figure 5B:
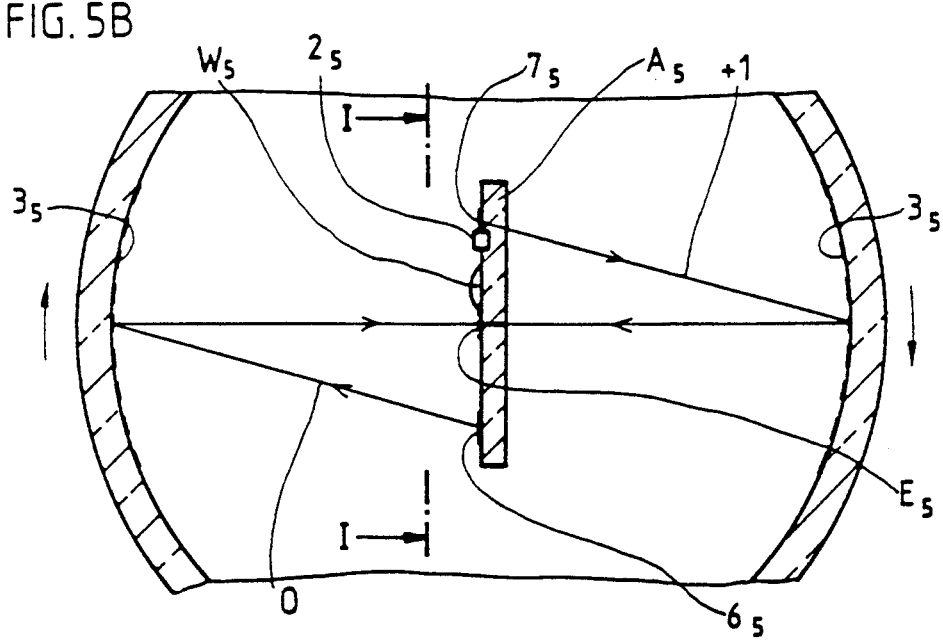
FIG. 5B is a partial plan view of the angle measuring arrangement illustrated in FIG. 5A.
Figure 5C:
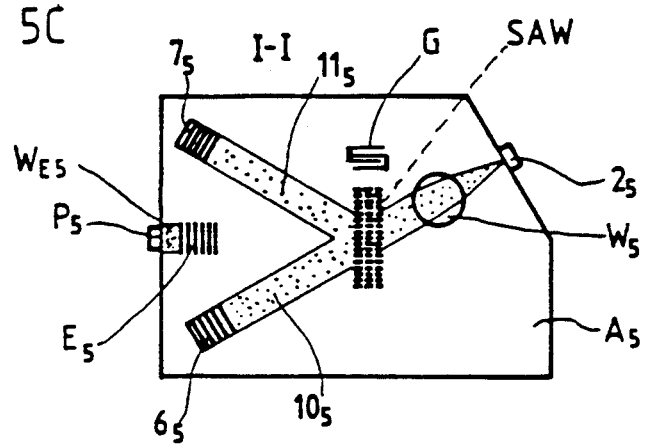
FIG. 5C is a view through lines I—I of the scanning arrangement for the angle measuring arrangement illustrated in FIG. 5A.

FIGS. 5A to 5C illustrate another embodiment of the drum transmitter. As in the embodiment illustrated in FIGS. 4A to 4C, the substrate illustrated in FIGS. 5A to 5C represents a scanning arrangement $A_5$ constructed as an integrated-optical device. The substrate illustrated in FIG. 5C should again be imaged in the correct position for the views of FIGS. 5A and 5B.

In this embodiment, a semiconductor laser $2_5$ emits light into a waveguide lens $W_5$. The parallel-aligned beam bundle impinges at the so-called Bragg angle on the so-called acoustic surface wave SAW. The so-called surface wave SAW is generated by an acoustic surface wave generator G. The acoustic surface wave SAW acts as a refraction grid such that the zero order is guided onward in an uninfluenced manner. However, the first order is refracted according to the Bragg condition and is frequency shifted according to the frequency of the acoustic surface wave SAW.

The partial beam bundle 0 which is guided in the light waveguide $10_5$ to a decoupling grid $6_5$ is decoupled "forward" (as the term "forward" was explained with respect to FIG. 4). The partial beam bundle 0 is then directed into a circular graduation $3_5$ of a cylinder $4_5$. The partial beam bundle 0 is again refracted, reflected and directed upon a coupling-in grid $E_5$ on the substrate of the scanning arrangement $A_5$ by means of the circular graduation $3_5$.

The partial beam bundle $+1$ of the first order of refraction is guided over waveguide $11_5$ to a decoupling grid $7_5$ and decoupled to the "rear" zone, which is the zone which lies exactly opposite the initial impingement zone of the partial beam bundle 0 upon the circular graduation $3_5$. The partial beam bundle $+1$ impinges on the circular graduation $3_5$ in this "rear" zone. The beam bundle $+1$ is refracted and reflected by means of the circular graduation $3_5$, such that the partial beam bundle $+1$ strikes the coupling-in grid $E_5$ strikes from "behind" and interferes with the partial beam bundle 0 in this zone. The resulting beam bundle is transmitted by means of the waveguide $W_{E5}$ to a detector $P_5$. The detector P5 then generates a scanning signal in a manner known in the art.

The coupling-in and decoupling grids may be, for example, blown grids, grids provided with reflection layers, etc. These coupling-in and decoupling grids may be formed in such a way that they decouple only in one direction, in such a way that they decouple in several directions, or such that they couple-in from one or several directions, depending on the particular application.

Therefore the present invention provides a high-resolution angle measuring arrangement with a smaller and simpler construction than presently available angle measuring arrangements. In addition, the angle measuring arrangement of the present invention also provides a device with higher measuring accuracy and higher operating reliability than available angle measuring arrangements. The angle measuring arrangement is extremely small in size and substantially insensitive to environmental influences due to the integrated-optical construction of the device.

The foregoing description of the preferred embodiments of the present invention has been presented for purposes of illustration and description. They are not intended to be exhaustive or to limit the invention to the precise forms disclosed Any modifications and variations are possible in light of the above teachings. It is intended that the scope of the invention be defined by the following claims, including all equivalents.

I claim:

1. An interferometric photoelectric angle measuring arrangement having a circular graduation carried on a graduation carrier and scanning means for the diametrical scanning of the circular graduation, the improvement comprising the scanning means being constructed as an integrated optical circuit comprising:
   first coupling-in means for receiving and coupling in refracted light;
   decoupling means for decoupling and transmitting received light;
   a first strip wave guide connecting the first coupling-in means to the decoupling in means;
   second coupling in means for receiving and coupling in receiving light, the second coupling-in means disposed to receive light from the decoupling means;
   coupler means having inputs and outputs for interferometrically coupling light;
   a second strip waveguide connecting the second coupling-in means to the input of the coupler means; and
   sensors connected to the outputs of the coupler means.

2. An interferometric photoelectric angle measuring arrangement according to claim 1 wherein the coupling-in means comprise coupling-in grids and optical constriction means for constricting light; and wherein the decoupling means comprise optical expansion means for expanding light and decoupling grids.

3. An interferometric photoelectric angle measuring arrangement having a circular graduation carried on a graduation carrier and scanning means for the diametrical scanning of the circular graduation, the improvement comprising the scanning means being constructed as an integral optical circuit comprising:
   at least two focusing coupling-in grids;
   at least two decoupling grids, one decoupling grid associated with each coupling-in grid, the decoupling grids having outputs;
   at least two waveguides, each waveguide connecting respective coupling-in and decoupling grids; and
   an optical polarizer engaging the outputs of the decoupling grids.

4. An interferometric photoelectric angle measuring arrangement according to claim 3 wherein the waveguides are construed as layer or strip waveguides.

5. An interferometric photoelectric angle measuring arrangement having a circular graduation carried on a graduation carrier and scanning means for the diametrical scanning of the circular graduation, the improvement comprising the scanning means being constructed as an integrated optical circuit comprising:
   at least two collimating coupling-in grids;
   at least two decoupling grids, a waveguide connecting each respective coupling-in grid to a respective decoupling grid; and
   phase shifting means disposed in the optical path from at least one of one coupling-in grid to a decoupling grid.

6. An interferometric photoelectric angle measuring arrangement according to claim 3, wherein the angle measuring arrangement includes a graduating disk having a radial circular graduation and wherein the scanning means is arranged parallel to the graduating disk and, therefore perpendicular to the axis of rotation.

7. An interferometric photoelectric angle measuring arrangement according to claim 5, wherein the angle measuring arrangement includes a graduating disk having a radial circular graduation and wherein the scanning means is arranged parallel to the graduating disk and, therefore perpendicular to the axis of rotation.

8. An interferometric photoelectric angle measuring arrangement according to claim 5 wherein the waveguide is constructed as a layer or strip waveguide.

9. An interferometric photoelectric angle measuring arrangement according to claim 5, wherein the phase shifting means comprises a zone in the waveguide having a refractive index different from the refractive index of the rest of the waveguide.

10. An interferometric photoelectric angle measuring arrangement having a circular graduation carried on a graduation carrier and scanning means for the diametrical scanning of the circular graduation, the improvement comprising the scanning means being constructed as an integrated optical circuit comprising:
    a first waveguide connected to second and third waveguides, the second and third waveguides having decoupling grids arranged to decouple light in diametrical directions, the diametrical direction defining a forward and a backward direction;
    a coupling-in grid having inlet and an outlet sides, the coupling-in grid arranged to receive light from decoupling grids from the forward and backward directions;
    a fourth waveguide connected to the inlet side of the coupling-in grid; and
    at least one sensor engaging the outlet side of the fourth waveguide.

11. An interferometric photoelectric angle measuring arrangement according to claim 10, wherein the scanning means includes an acoustic surface-wave generator for generating an acoustic surface wave in the waveguide.

12. An interferometric photoelectric angle measuring arrangement according to claim 3, wherein the graduation carrier and circular graduation comprise a cylinder having a circular graduation concentrically disposed about the cylinder and wherein the scanning means is arranged substantially centrally, parallel to the axis of the rotation of the cylinder.

13. An interferometric photoelectric angle measuring arrangement according to claim 5, wherein the graduation carrier and circular graduation comprise a cylinder having a circular graduation concentrically disposed about the cylinder and wherein the scanning means is arranged substantially centrally, parallel to the axis of the rotation of the cylinder.

14. An interferometric photoelectric angle measuring arrangement according to claim 10, wherein the graduation comprise a cylinder having a circular graduation concentrically disposed about the cylinder and wherein the scanning means is arranged substantially centrally, parallel to the axis of the rotation of the cylinder.

* * * * *

UNITED STATES PATENT AND TRADEMARK OFFICE
CERTIFICATE OF CORRECTION

PATENT NO. : 5,001,340

DATED : March 19, 1991

INVENTOR(S) : Ernst Schwefel et al.

It is certified that error appears in the above-identified patent and that said Letters Patent is hereby corrected as shown below:

In column 3, line 56, after "into" please delete --,--.

In column 4, line 54, please delete "33" and substitute therefor --$3_3$--.

In column 4, line 57, please delete "P23" and substitute therefor --$P2_3$--.

In column 5, line 33, please delete "A" and substitute therefor --A'--.

In column 5, line 40, please delete "A" and substitute therefor --A'--.

In column 5, line 48, please delete 74" and substitute therefor --$7_4$--; and delete "$10_4$" and substitute therefor --$11_4$--.

In column 6, line 23, please delete "GE" and substitute therefor --$G_E$--.

In column 6, line 67, please delete "P5" and substitute therefor --$P_5$--.

UNITED STATES PATENT AND TRADEMARK OFFICE
CERTIFICATE OF CORRECTION

PATENT NO. : 5,001,340

DATED : March 19, 1991

INVENTOR(S) : Ernst Schwefel et al.

It is certified that error appears in the above-identified patent and that said Letters Patent is hereby corrected as shown below:

Column 7:

In claim 1, line 13, please delete "coupling in" and substitute therefor --coupling-in--.

In claim 4, line 3, please delete "construed" and substitute therefor --constructed--.

Signed and Sealed this

Twelfth Day of January, 1993

Attest:

DOUGLAS B. COMER

*Attesting Officer*     Acting Commissioner of Patents and Trademarks